US012436898B2

(12) United States Patent
Abraham et al.

(10) Patent No.: US 12,436,898 B2
(45) Date of Patent: Oct. 7, 2025

(54) CACHE INJECTION AND PREFETCH MECHANISMS FOR IMPROVING MULTI-DIE PROCESSING SYSTEM PERFORMANCE

(71) Applicant: Advanced Micro Devices, Inc., Santa Clara, CA (US)

(72) Inventors: Shaju Abraham, Bangalore (IN); Akash A, Bengaluru (IN); Naveen M, Bangalore (IN); Shreeroop Ajaykumar, Kannur (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 18/537,154

(22) Filed: Dec. 12, 2023

(65) Prior Publication Data

US 2025/0190367 A1 Jun. 12, 2025

(51) Int. Cl.
*G06F 12/00* (2006.01)
*G06F 12/0811* (2016.01)
*G06F 12/128* (2016.01)
*G06F 12/0862* (2016.01)

(52) U.S. Cl.
CPC ........ *G06F 12/128* (2013.01); *G06F 12/0811* (2013.01); *G06F 12/0862* (2013.01)

(58) Field of Classification Search
CPC . G06F 12/128; G06F 12/0811; G06F 12/0862
See application file for complete search history.

(56) References Cited

U.S. PATENT DOCUMENTS

| 5,371,870 | A | * | 12/1994 | Goodwin | G06F 12/0862 |
| | | | | | 711/213 |
| 6,353,874 | B1 | * | 3/2002 | Morein | G06F 12/0802 |
| | | | | | 711/134 |
| 7,430,650 | B1 | * | 9/2008 | Ross | G06F 12/0862 |
| | | | | | 711/213 |
| 9,569,364 | B1 | * | 2/2017 | Heyrman | G06F 12/0804 |
| 2016/0328330 | A1 | * | 11/2016 | Ayub | G06F 12/0875 |

FOREIGN PATENT DOCUMENTS

| CN | 108984428 | A | * | 12/2018 | ........ G06F 12/123 |
| KR | 101681423 | B1 | * | 11/2016 | ........ G06F 9/3814 |

* cited by examiner

*Primary Examiner* — Shawn X Gu
*Assistant Examiner* — Mohammad S Hasan
(74) *Attorney, Agent, or Firm* — FIG. 1 Patents

(57) ABSTRACT

According to one aspect, a system includes a processor core, a history buffer, a history buffer logic, and an interrupt controller. The processor core is configured to issue a trigger that causes the history buffer logic to, after a fixed time, flush existing entries in the history buffer and start adding new entries into the history buffer. According to another aspect, a system includes a processor core that includes a load store tracker buffer and a prefetch engine. The buffer is configured to track a critical section memory location associated with critical section data fetched by the processor core. The prefetch engine is configured to obtain the critical section memory location from a previous load store tracker buffer associated with a previous lock holder processor core. The system also includes a lock manager configured to signal the buffer to start and stop tracking the critical section memory.

20 Claims, 8 Drawing Sheets

CACHE INJECTION AND PREFETCH MECHANISMS FOR IMPROVING MULTI-DIE PROCESSING SYSTEM PERFORMANCE

BACKGROUND

A multi-die processing system is a configuration in which multiple semiconductor dies, or chips, are combined to work together as a single functional unit. Each die typically contains its own set of transistors, logic circuits, memory elements, and other components. By integrating multiple dies within a single package, a multi-die processing system can offer enhanced performance, power efficiency, and functionality compared to using a single monolithic die.

Although multi-die processing system architectures provide several benefits over single monolithic die system architectures, multi-die processing system architectures introduce new problems, such as increased latency from communication and data transfer between different semiconductor dies within the system. These latency issues can impact performance, responsiveness, and overall system efficiency.

DETAILED DESCRIPTION

Overview

Figure 1A:
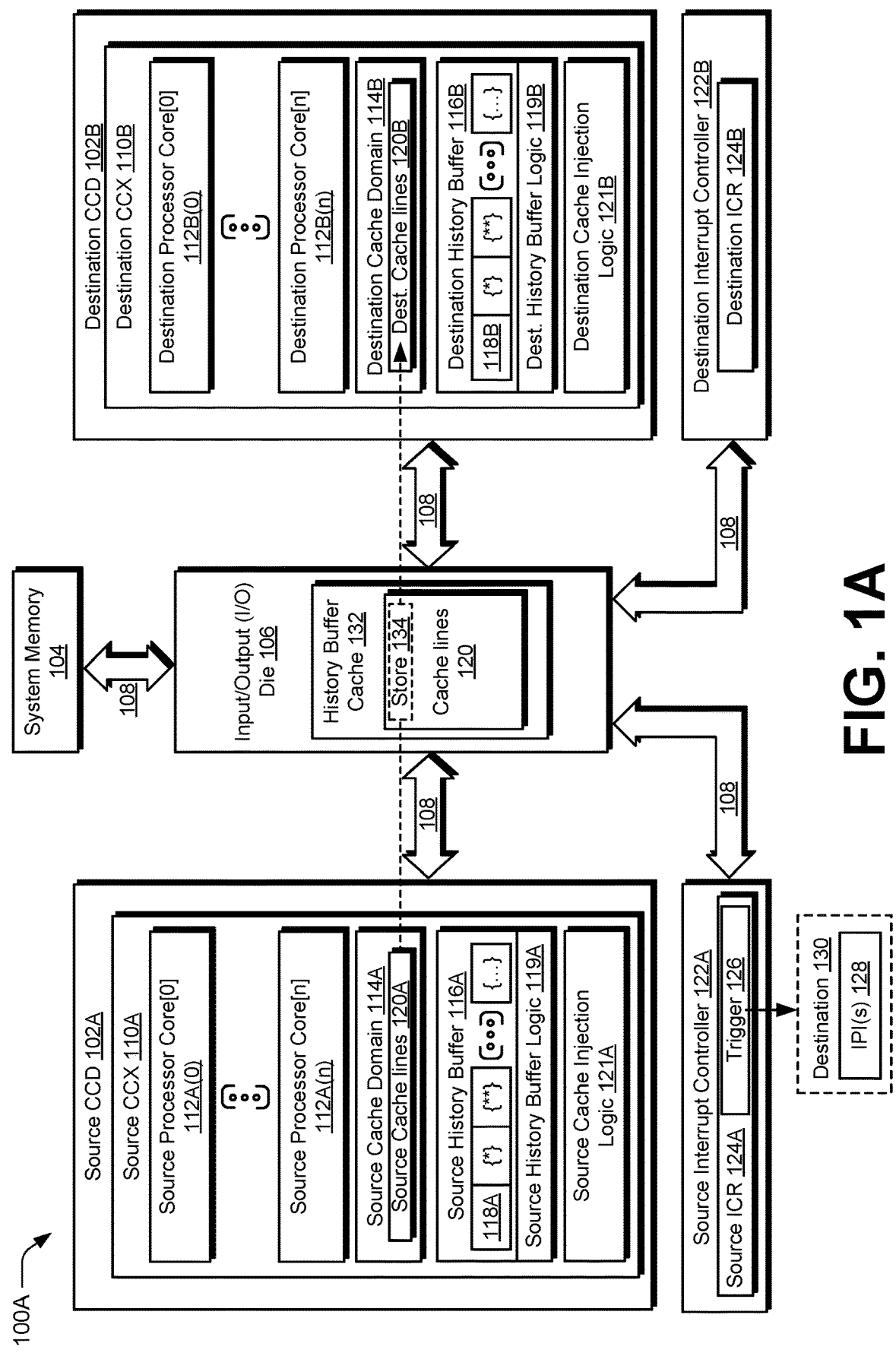
FIG. 1A is a block diagram depicting a non-limiting example system having, in part, a source core complex die that includes a source cache injection logic configured to inject cache lines into a cache domain of a destination core complex die (e.g., the same or a different non-uniform memory access (NUMA) node or socket) in response to a trigger, such as a hardware or software trigger.

Cache injection and prefetching mechanisms help mitigate latency problems in multi-die processing systems by optimizing memory access patterns and reducing the impact of data transfer delays between different dies. Cache injection involves deliberately populating cache lines with specific data before a program accesses the data. This process is often used to mitigate the effects of cold starts, where cache lines are not present in the cache and data access incurs a cache miss. Cache injection aims to proactively preload cache with relevant data to reduce the occurrence of these cache misses. Prefetching is a runtime technique that aims to anticipate and fetch data into a cache before the data is required by the executing program. This involves predicting memory access patterns and initiating cache line fetches based on those predictions.

Scenarios exist when a program or source processor core knows ahead of time what data will be accessed and which processor core(s) will access the data. A typical example of this is an inter-processor interrupt (IPI) where the information about the destination processor core is embedded in an interrupt control register (ICR). Another example is a spin unlock operation where the destination processor core (i.e., next lock waiter) information is available.

An IPI is a communication mechanism in a multi-processor system where one processor sends an interrupt signal to another processor or multiple processors. An IPI allows for inter-processor communication and synchronization in a multi-processing environment. The primary purpose of an IPI is to facilitate communication and coordination between different processors within a multi-processor system. An IPI allows processors to interrupt and notify each other about specific events or to request synchronization. When a processor sends an IPI, the processor generates a specific interrupt signal that is received by the target processor(s). The interrupt signal interrupts the normal execution flow of the target processor(s) and transfers control to an interrupt handler or a designated routine to process the interrupt.

IPIs are used in various scenarios. IPIs are used to synchronize the execution of multiple processors. For example, a processor sends an IPI to notify other processors to perform a specific task simultaneously. IPIs enable communication between processors. Processors use IPIs to exchange messages or share data, allowing for cooperation and coordination in a multi-processor environment. IPIs are often used by an operating system to manage task wakeup operations and translation lookaside buffer (TLB) shootdown, as well as system-wide events, such as system shutdown, power management, and configuration updates.

There are different types of IPIs, depending on the specific functionalities and capabilities of the system. A directed IPI is used by a processor to send an IPI to one or more target processors. A broadcast IPI is used by a processor to send an IPI to all other processors in the system. Some IPIs are masked or selectively ignored by the target processor(s) based on priority. Some systems provide multiple channels or vectors to differentiate between different types of IPIs or to allocate priority levels.

IPIs enable processors in multi-processor systems to communicate, synchronize activities, and coordinate system-wide operations. IPIs facilitate efficient cooperation and parallelism among processors, enhancing the performance and scalability of multiprocessing environments.

Operating systems invoke IPIs to execute jobs on one or more target processors. Before an IPI is sent, a source processor accesses one or more data structures, such as a call function data structure and/or one or more buffers shared between source and destination processor cores. These one or more data structures are accessed by a remote processor in the near future. If the remote processor resides in the same processor group (e.g., the same processor die), the data is already present in its local cache domain (e.g., L1, L2, or L3 cache). The remote processor should experience less latency since the data is already in the local cache domain. If the remote processor resides in a remote processor group (e.g., a different processor die), however, it is unlikely that the data is stored in the local cache domain. The data will be brought into the local cache domain when the IPI handler accesses it.

This takes time and increases the IPI processing time. Cross processor (or cross processor group) performance is impacted as a result.

A spinlock is a synchronization mechanism used in computer programming to coordinate the execution of multiple threads or processes in a multi-threaded or multi-processor environment. The purpose of a spinlock is to ensure that only one thread at a time has access to a critical section of code. A critical section of code refers to a portion of a computer program where access to shared resources or data is carefully controlled to avoid conflicts, data corruption, and/or unexpected behavior when multiple threads or processes are executing concurrently in a multi-threaded or multi-processor environment. In other words, a critical section is a region of code that should be executed by one thread or process at a time to maintain data integrity and program correctness.

In a multi-threaded environment, when one thread is spinning on a lock, another thread is likely to be executing. If the executing thread triggers prefetches based on its memory access pattern, this helps ensure that the data requested by the waiting thread is already present in the cache when the lock is eventually acquired. In this way, prefetching indirectly benefits the waiting thread by reducing memory access latency when the waiting thread acquires the lock and accesses the data in the critical section.

When a thread acquires a spinlock and enters a critical section, the thread possibly accesses data stored in memory locations that are not yet present in the cache. This, at times, leads to cache misses and increased latency. Cache injection is used to preload relevant data into the cache before a thread enters a critical section protected by a spinlock. This helps reduce the impact of cache misses and improve the overall performance of the thread when the thread executes the critical section.

Regular spinlocks are inefficient when contention is high, as multiple threads spinning simultaneously leads to excessive CPU usage and contention-related slowdowns. A queued spinlock is an improvement over the regular spinlock that aims to provide fairness and avoid the problems associated with high contention. In a queued spinlock, threads that are trying to acquire the lock are organized in a queue, and each thread gets a ticket number indicating its position in the queue. Threads spin only while their ticket number is not the next in line.

In many cases, spinlocks are used to protect some shared data structure (i.e., the critical section). If there are multiple threads accessing the critical section, the same data is fetched at multiple cores in a sequential manner. If the next lock waiter is known beforehand, the data is prefetched to the next lock waiter core. A queued spinlock has this information about the lock waiters embedded in its implementation.

The concepts and technologies disclosed herein improve processing times in multi-die processing system architectures. According to one aspect of the concepts and technologies disclosed herein, IPI processing time is improved by reducing the time it takes for data to be brought into a local cache domain at a remote processor. More particularly, in one aspect, the concepts and technologies disclosed herein improve IPI processing time by implementing a cache injection mechanism that enables asynchronous non-temporal communication of data from one or more source processors to one or more destination processors.

The disclosed cache injection mechanism is provided, at least in part, by a history buffer and a source cache injection logic, both located at or near the source processor(s). The history buffer stores cache line addresses associated with recently accessed cache lines. In some implementations, the history buffer alternatively or additionally stores memory addresses associated with one or more user-provided hints. The source cache injection logic transfers cache lines to a destination cache domain of the destination processor(s). In one or more implementations, the source cache injection logic transfers the cache lines to the destination cache domain of the destination processor(s) when a trigger is received. The trigger, in some implementations, is a software trigger, such as a memory mapped I/O (MMIO) write to an interrupt command register (ICR) that generates an IPI. Other software triggers are contemplated, such as a spin unlock operation. In other implementations, the trigger is a hardware trigger.

In one example implementation, a history buffer logic fills the history buffer with cache line addresses until a trigger is received. After the trigger is received, the cache injection logic unit initiates cache injection and causes the source processor to transfer cache lines associated with the cache line addresses stored in the history buffer to the destination processor(s). In the meantime, the history buffer is frozen (i.e., no new cache line addresses are added, and no existing cache line addresses are removed) until a timeout period expires. In some instances, the source processor(s) sends multiple IPIs concurrently to multiple destination processor(s). The timeout period reduces the likelihood of another IPI being sent and retriggering the cache injection process. In some implementations, a history buffer cache is used to store frequently accessed cache lines. The availability of frequently accessed cache lines from the history buffer cache offers additional latency improvements over the cache injection mechanism alone.

Current implementations of IPI processing introduce a total latency equal to the sum of the latencies associated with a source processor accessing a set of cache lines, the source processor sending an IPI to a destination processor, the destination processor experiencing a cache miss, and the source processor then sending data to the destination processor. The techniques described herein provide opportunities to reduce this total latency, in part, by reducing cache misses and the latency introduced when data is transferred from the source processor to the destination processor.

In some aspects, the techniques described herein relate to a system including: a processor core; a history buffer and a history buffer logic associated with the processor core; and an interrupt controller connected to the processor core, the interrupt controller including an interrupt command register, and the processor core is configured to issue a trigger, triggering the history buffer logic to, after a fixed time, flush existing entries in the history buffer and start adding new entries into the history buffer.

In some aspects, the techniques described herein relate to a system, further including: a destination processor core; a destination cache domain; and a cache injection logic unit configured to transfer cache lines associated with cache line addresses stored as the existing entries in the history buffer to the destination cache domain.

In some aspects, the techniques described herein relate to a system, wherein the processor core is part of a first core complex, and the destination processor core is part of a second core complex.

In some aspects, the techniques described herein relate to a system, wherein the first core complex includes multiple source processor cores including the processor core, and the second core complex includes multiple destination processor cores including the destination processor core.

In some aspects, the techniques described herein relate to a system, wherein the first core complex is part of a first core complex die, and the second core complex is part of a second core complex die.

In some aspects, the techniques described herein relate to a system, wherein the first core complex die includes multiple core complexes including the first core complex, the second core complex die includes multiple core complexes including the second core complex, and the first core complex die and the second core complex die are on a same non-uniform memory access node or a different non-uniform memory access node.

In some aspects, the techniques described herein relate to a system, wherein the first core complex die includes multiple core complexes including the first core complex, the second core complex die includes multiple core complexes including the second core complex, and the first core complex die and the second core complex die are on a same socket or a different socket.

In some aspects, the techniques described herein relate to a system, wherein the processor core and the destination processor core are both connected to an input/output die that includes: a history buffer cache configured to store one or more frequently accessed cache lines of the cache lines; or a history buffer cache configured to store one or more frequently accessed cache line addresses of one or more frequently accessed cache lines.

In some aspects, the techniques described herein relate to a system, wherein the destination cache domain includes a multilevel cache hierarchy. For example, the multilevel cache hierarchy includes a level 3 cache connected to the destination processor core, a level 2 cache residing on the destination processor core, or a level 1 cache residing on the destination processor core.

In some aspects, the techniques described herein relate to a system, wherein the trigger includes a memory-mapped input/output write command (e.g., an interrupt command register write operation) or a spin unlock operation.

In some aspects, the techniques described herein relate to a method including filling buffer entries of a history buffer with cache line addresses; stopping filling the buffer entries of the history buffer in response to a trigger; transferring the cache line addresses in the buffer entries to a destination; maintaining the buffer entries for a timeout period; and flushing the buffer entries after the timeout period.

In some aspects, the techniques described herein relate to a method, wherein filling the buffer entries of the history buffer with the cache line addresses includes filling the buffer entries of the history buffer with the cache line addresses in response to operations performed by a source processor core.

In some aspects, the techniques described herein relate to a method, wherein transferring the cache line addresses in the buffer entries to the destination includes transferring the cache line addresses in the buffer entries to a cache domain associated with a destination processor core.

In some aspects, the techniques described herein relate to a method, wherein the cache domain includes a multilevel cache hierarchy. For example, the multilevel cache hierarchy includes a level 3 cache, a level 2 cache, or a level 1 cache.

In some aspects, the techniques described herein relate to a method, wherein transferring the cache line addresses in the buffer entries to the destination includes transferring the cache line addresses in the buffer entries to a level 3 cache associated with multiple destination processor cores of a destination core complex residing on a destination core complex die.

In some aspects, the techniques described herein relate to a system including a processor core that includes a load store tracker buffer and a prefetch engine. The load store tracker buffer is configured to track a critical section memory location associated with critical section data fetched by the processor core. The prefetch engine is configured to obtain the critical section memory location from a previous load store tracker buffer associated with a previous lock holder processor core. The system also includes a lock manager configured to signal the load store tracker buffer to start and stop tracking the critical section memory.

In some aspects, the techniques described herein relate to a system, further including a core complex including a plurality of processor cores, the plurality of processor cores including the processor core.

In some aspects, the techniques described herein relate to a system, wherein the lock manager serves the plurality of processor cores in the core complex.

In some aspects, the techniques described herein relate to a system, wherein the lock manager is configured to signal the load store tracker buffer to start tracking the critical section memory in response to a spin lock operation performed by the processor core.

In some aspects, the techniques described herein relate to a system, wherein the lock manager is configured to signal the load store tracker buffer to stop tracking the critical section memory in response to a spin unlock operation performed by the processor core.

FIG. 1A is a block diagram of a non-limiting example multi-die processing system 100A (hereafter "system 100A"). The illustrated system 100A includes a source core complex die (CCD) 102A, a destination CCD 102B, and a system memory 104. The source CCD 102A, the destination CCD 102B, and the system memory 104 are communicatively coupled to an input/output (I/O) die 106 via a connection/interface 108. The connection/interface 108, in some implementations, includes multiple hardware interconnects that run a common communications protocol used by the CCDs 102, the system memory 104, and other components described herein to communicate. It should be understood that the terms "source" and "destination" are used herein to represent the flow of data from a source to a destination. These designations are not intended to diminish the scope of the capabilities of either the source or the destination components to performing only source or destination operations. As such, the destination CCD 102B is capable of functioning like the source CCD 102A and vice versa. The source CCD 102A and the destination CCD 102B, at times, are referred to individually as "the CCD 102" or collectively as "the CCDs 102." Moreover, although one source CCD 102A and one destination CCD 102B are shown, some implementations include multiple source CCDs 102A and/or multiple destination CCDs 102B.

The CCDs 102 broadly represent processor architectures that include multiple processor cores along with shared resources, such as cache and interconnects, designed to enable efficient inter-core communication, workload distribution, and resource sharing within the processor package (e.g., a single semiconductor die). In one or more implementations, the source CCDs are configured according to a particular microarchitecture. For instance, in the illustrated example, the CCDs 102 are configured, at least in part, according to "Zen" microarchitecture developed by Advanced Micro Devices® for processors such as AMD Ryzen™, AMD EPYC™, and AMD Threadripper™ processors. Those skilled in the art will appreciate that the concepts and technologies described herein are applicable to any other microarchitectures, such as future versions of "Zen" microarchitecture, future versions of other microarchitectures, and the like. Accordingly, the CCDs 102 should not be construed as being limited to any particular microarchitecture or any particular form of cross socket communication.

In one or more implementations, the system memory 104 is a circuit board (e.g., a printed circuit board), on which one or more memory chips are mounted. Examples of the system memory 104 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In some examples, the system memory 104 is composed of multiple memory chips implemented as vertical ("3D") stacks, placed side-by-side on an interposer or substrate, or assembled via a combination of vertical stacking and side-by-side placement.

The system memory 104 is used to store data shared between the CCDs 102. In one or more implementations, the system memory 104 corresponds to semiconductor memory where the data is stored within memory cells on one or more integrated circuits. In at least one example, the system memory 104 corresponds to or includes volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), and static random-access memory (SRAM).

The I/O die 106 handles I/O operations and connectivity with external devices (not shown). The I/O die 106 also serves as a hub for various I/O interfaces, memory controllers, and other system-level components within the system 100A. The I/O die 106 provides support for various I/O functions and interfaces required for communication with external devices. In one or more implementations, the I/O die 106 includes interfaces, such as peripheral component interconnect express (PCIe) configured to connect internal peripheral devices (e.g., graphics cards and storage devices), universal serial bus (USB) for connecting external peripherals (e.g., mouse and keyboard), serial advanced technology attachment (SATA) for storage devices, and WI-FI and/or Ethernet adapters for network connectivity. In one or more implementations, the I/O die 106 includes one or more memory controllers configured to interface with the system memory 104. As such, the I/O die 106 also manages memory access, including reading and writing data to and from the system memory 104. The memory controller(s) in the I/O die 106 also facilitate communication between processor cores within the CCDs 102 and the system memory 104.

In one or more implementations, the I/O die 106 includes high-speed interconnects, such as at least part of the connection/interface 108, to facilitate communication between processor cores, cache hierarchies, the system memory 104, and/or other components within the system 100A. These interconnects provide fast and efficient data transfer, allowing for seamless communication between different parts of the system 100A.

In one or more implementations, the I/O die 106 handles power distribution, providing stable and regulated power to the various components within the system 100A. The I/O die 106, in some implementations, also manages clock distribution to properly synchronize components of the system 100A.

In the illustrated example, the I/O die 106 connects, via the connection/interface 108, multiple CCDs 102. Each CCD 102 includes a core complex (CCX). For instance, the source CCD 102A includes a source CCX 110A, and the destination CCD 102B includes a destination CCX 110B. Although one source CCX 110A and one destination CCX 110B are shown, some implementations include multiple source CCXs 110A and/or multiple destination CCXs 110B. The I/O die 106 functions as a central hub to enable communication between the CCDs 102 and various I/O interfaces and memory controller(s) housed in the I/O die 106.

In accordance with the described techniques, the CCDs 102 and the system memory 104 are coupled to one another via a wired or wireless connection, which is depicted in the illustrated example of FIG. 1 as the connection/interface 108. Example wired connections include, but are not limited to, buses (e.g., a data bus), interconnects, traces, and planes. Examples of devices in which the system 100A is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

In the illustrated example, the source CCX 110A includes a set of two or more source processor cores 112A(0)-112A(n), where n represents any integer. Similarly, in the illustrated example, the destination CCX 110B includes a set of two or more destination processor cores 112B(0)-112B(n), where n represents any integer. The source CCX 110A and the destination CCX 110B, at times, are referred to individually as "the CCX 110" or collectively as "the CCXs 110." The source processor cores 112A and the destination processor cores 112B, at times, are referred to individually as "the processor core 112" or collectively as "the processor cores 112."

The processor cores 112 perform computational tasks for the system 100A. The processor cores 112 are responsible for executing instructions (e.g., program instructions), performing arithmetic and logic operations, managing the flow of data, and/or other computational tasks. In one or more implementations, the processor cores 112 fetch instructions from the system memory 104 and decode the instructions into micro-operations and/or control signals that the processor cores 112 execute. Once the instructions are decoded, the processor cores 112 execute the instructions to perform operations, such as arithmetic calculations, logical comparisons, data movement, control flow, and the like.

In some implementations, the processor cores 112 are configured to support simultaneous multi-threading that allows the processor cores 112 to handle multiple threads simultaneously, improving overall throughput and efficiency by utilizing idle execution resources with the processor cores 112. In one or more implementations, the processor cores 112 are configured to implement pipelining and/or superscalar execution techniques to improve performance. Pipelining divides instruction execution into multiple states to enable concurrent execution of multiple instructions at different states of the pipeline. Superscalar execution allows the processor cores 112 to execute multiple instructions in parallel by leveraging multiple execution units.

In one or more implementations, the processor cores 112 are configured to utilize a cache hierarchy that includes multiple cache levels, such as level 1 (L1), level 2 (L2), and level 3 (L3). For example, in some implementations, each processor core 112 includes a dedicated L1 cache, a shared L2 cache, and a shared L3 cache. In the illustrated example, the source processor cores 112A within the source CCX 110A have access to a source cache domain 114A, and the destination processor cores 112B within the destination CCX 110B have access to a destination cache domain 114B. The source cache domain 114A and the destination cache domain 114B, at times, are referred to herein individually as "the cache domain 114" or collectively as "the cache domains 114." Each of the cache domains 114 is representative of L1, L2, and L3 caches within the corresponding CCXs 110. Moreover, the cache domains 114 include dedicated, shared, or a combination of dedicated and shared caches of various levels. In some implementations, each processor core 112 also includes a micro-operations cache that stores frequently used micro-operations, enhancing performance by reducing repeated fetch and decode operations. The cache domains 114, although described herein with a specific cache hierarchy in some examples, should not be construed as being limiting to any particular cache hierarchy.

According to the techniques disclosed herein, in the illustrated example, the source CCX 110A also includes a source history buffer 116A. The source history buffer 116A stores one or more source cache line addresses 118A associated with one or more source cache lines 120A in the source cache domain 114A. In some implementations, the source history buffer 116A is a hardware storage component (e.g., one or more memory circuits or portion(s) thereof) configured to manage data (e.g., the cache line addresses 118A) by temporarily saving the data in a state that is easier to move, process, and/or manipulate versus other data storage techniques. In the illustrated example, the source history buffer 116A is illustrated as a separate memory/cache component, although the source history buffer 116A, in some implementations, is a region of memory or cache (e.g., a region of one or more caches in the source cache domain 114A).

A source history buffer logic 119A is shown in communication with the source history buffer 116A and controls operations of the source history buffer 116A. In one or more implementations, the source history buffer logic 119A is or includes hardware logic, such as one or more logic gates, configured to control operations of the source history buffer 116A. For example, the source history buffer logic 119A controls filling the source history buffer 116A with the source cache line addresses 118A, stopping filling the source history buffer 116A with the source cache line addresses 118A, initiating cache injection (e.g., from the source processor core 112A to the destination processor core(s) 112B,) and initiating and managing a history buffer timeout period (i.e., buffer freeze) during which no source cache line addresses 118A are added or removed from the source history buffer 116A. In one or more implementations, the source processor core 112A includes the source history buffer logic 119A or is otherwise configured to perform the functionality of the source history buffer logic 119A. The source processor core 112A and the source history buffer logic 119A, in some implementations, are co-located on the same processor die. In this manner, the source processor core 112A is capable of causing the source history buffer logic 119A to perform its operations at the control of the source processor core 112A with minimal delay.

Similarly, the destination CCX 110B includes a destination history buffer 116B. The destination history buffer 116B stores one or more destination cache line addresses 118B associated with one or more destination cache lines 120B in the destination cache domain 114B. In some implementations, the destination history buffer 116B is a hardware storage component (e.g., one or more memory circuits or portion(s) thereof) configured to manage data (e.g., the cache line addresses 118B) by temporarily saving the data in a state that is easier to move, process, and/or manipulate versus other data storage techniques. In the illustrated example, the destination history buffer 116B is illustrated as a separate memory/cache component, although the destination history buffer 116B, in some implementations, is a region of memory or cache (e.g., a region of one or more caches in the destination cache domain 114B).

A destination history buffer logic 119B controls operations of the destination history buffer 116B. In one or more implementations, the destination history buffer logic 119B is or includes hardware logic, such as one or more logic gates, configured to control operations of the destination history buffer 116B. For example, the destination history buffer logic 119B controls filling the destination history buffer 116B with the destination cache line addresses 118B, stopping filling the destination history buffer 116B with the destination cache line addresses 118B, initiating cache injection (e.g., from the destination processor core 112B to the source processor core(s) 112B), and initiating and managing a history buffer timeout period during which no destination cache line addresses 118B are added or removed from the destination history buffer 116B. In one or more implementations, the destination processor core 112B includes the destination history buffer logic 119B or is otherwise configured to perform the functionality of the destination history buffer logic 119B. The destination processor core 112B and the destination history buffer logic 119B, in some implementations, are co-located on the same processor die. In this manner, destination processor core 112B is capable of causing the destination history buffer logic 119B to perform its operations at the control of the destination processor core 112B with minimal delay.

The source history buffer 116A and the destination history buffer 116B, at times, are referred to herein individually as "the history buffer 116" or collectively as "the history buffers 116." The source cache line addresses 118A and the destination cache line addresses 118B, at times, are referred to herein individually as "the cache line address 118" or collectively as "the cache line addresses 118." The source history buffer logic 119A and the destination history buffer logic 119B, at times, are referred to herein individually as "the history buffer logic 119" or collectively as "the history buffer logics 119." The source cache lines 120A and the destination cache lines 120B, at times, are referred to herein individually as "the cache line 120" or collectively as "the cache lines 120."

Each of the cache line addresses 118 corresponds to one of the cache lines 120 in the cache domain 114. When a processor core 112 accesses the system memory 104, the processor core 112 fetches data in larger chunks (i.e., the cache lines 120), rather than fetching individual bytes or words. Each cache line 120 has a starting memory address (i.e., a cache line address 118), and the processor core 112 uses this address to determine where to store the fetched data within the cache domain 114.

The source CCX 110A also includes a source cache injection logic 121A and a source interrupt controller 122A. The source interrupt controller 122A includes a source interrupt command register (ICR) 124A. The destination CCX 110B also includes a destination cache injection logic 121B and a destination interrupt controller 122B. The destination interrupt controller 122B includes a destination ICR 124B.

The source cache injection logic 121A and the destination cache injection logic 121B, at times, are referred to herein individually as "the cache injection logic 121" or collectively as "the cache injection logics 121." The source interrupt controller 122A and the destination interrupt controller 122B, at times, are referred to individually as "the interrupt controller 122" or collectively as "the interrupt controllers 122." The source ICR 124A and the destination ICR 124B, at times, are referred to individually as "the ICR 124" or collectively as "the ICRs 124." Although the source interrupt controller 122A and the destination interrupt controller 122B are shown as separate components in FIG. 1, the source interrupt controller 122A and the destination interrupt controller 122B are combined in some implementations. The interrupt controllers 122, in some implementations, are advanced programmable interrupt controllers (APICs). Other interrupt generating hardware is contemplated.

In the illustrated example, the source history buffer 116A and the destination history buffer 116B are depicted as serving the source CCX 110A and the destination CCX 110B, respectively. In alternative implementations, each of the source processor cores 112A(0)-112A(n) has a dedicated source history buffer 116A, and/or each of the destination processor cores 112B(0)-112B(n) has a dedicated destination history buffer 116B. Regardless of the specific implementation, the source history buffer 116A is a buffer that stores the source cache line addresses 118A associated with recently accessed memory addresses, and the destination history buffer 116B is a buffer that stores the destination cache line addresses 118B associated with recently accessed memory addresses.

In one or more implementations, the history buffers 116 are fixed-size buffers. More particularly, the history buffers 116, in some implementations, are configured as circular buffers that allow continuous and wraparound storage of data. A circular buffer typically includes a head and a tail. The head represents the write position where new elements are added. The tail represents the read position from where elements are retrieved. When the head reaches the end of the buffer, the head wraps around to the beginning, allowing for continuous storage of elements. Similarly, when the tail reaches the end, the tail wraps around to the beginning for element retrieval. This wraparound behavior ensures efficient utilization of the fixed-size buffer without shifting or resizing the underlying storage. A circular buffer employs two pointers, one for the head and another for the tail, to keep track of the write and read positions, respectively. These pointers are incremented or wrapped around as elements are added or retrieved, ensuring proper positioning within the buffer. A circular buffer maintains information about whether the circular buffer is full or empty. When the head and tail pointers are at the same position, the circular buffer is considered empty. Conversely, when the head is one position behind the tail (or vice versa, depending on the implementation), the buffer is considered full. These conditions are checked to prevent overwriting existing data or reading nonexistent data. A circular buffer supports two primary operations: enqueue (adding elements) and dequeue (retrieving elements). The enqueue operation adds an element to the head position, while the dequeue operation retrieves an element from the tail position. After each operation, the respective pointer is updated to reflect the new positions.

In some implementations, the source cache injection logic 121A is a per CCX hardware block, such as one or more logic gates, configured to perform cache-to-cache injection. In other words, the source cache injection logic 121A transfers the source cache lines 120A associated with the source cache line addresses 118A that are stored in the source history buffer 116A to the destination cache domain 114B.

In one or more implementations, the source cache injection logic 121A is triggered by a trigger 126. For example, the trigger 126 causes an inter-processor interrupt (IPI) 128 to be sent to one or more of the processor cores 112. The IPI 128 is shown as being sent responsive to the trigger 126. The illustrated IPI 128 is shown as being directed to a specific destination 130, such as one or more of the destination processor cores 112B. Alternatively, the IPI 128 is a broadcast IPI, broadcast to the destination CCX 110B (or multiple CCXs 110) and the destination processor cores 112B (or other destination processor cores of other CCXs or sockets) contained therein.

The source interrupt controller 122A manages and controls interrupt handling. The source interrupt controller 122A is responsible for routing interrupts (e.g., the IPI(s) 12) from various sources, such as one or more of the source processor cores 112A. Interrupts are signals generated by devices or software to request attention from a processor, such as one or more of the processor cores 112. For instance, in the illustrated example, the source interrupt controller 122A receives and processes the IPI(s) 128 from different sources, such as I/O devices (i.e., via the I/O die 106), timers, and/or software (e.g., an operating system and/or a program). The source interrupt controller 122A then routes the IPI(s) 128 to the appropriate processor core(s) 112 or threads thereof for processing. In some implementations, the source interrupt controller 122A provides interrupt prioritization to allow more time-sensitive interrupts to be handled with higher priority. The source interrupt controller 122A, in some implementations, coordinates with the destination interrupt controller 122B to handle the IPI(s) 128 and ensure proper routing to a destination 130 (e.g., one or more of the destination processor cores 112B). Although the illustrated example depicts a source interrupt controller 122A in the source CCX 110A and a destination interrupt controller 122B in the destination CCX 110B, some implementations include one or more I/O interrupt controllers, which operate as part of the I/O die 106 to handle interrupts from external I/O devices. The source interrupt controller 122A and the destination interrupt controller 122B, in various implementations, provide additional features such as interrupt remapping, virtualization support, and interrupt sharing mechanisms to optimize interrupt handling.

The source interrupt controller 122A is depicted as including the source ICR 124A. Alternatively, the source interrupt controller 122A is operatively connected to the source ICR 124A. The source ICR 124A is a control register in the source interrupt controller 122A. The source ICR 124A controls IPIs, such as the IPI(s) 128, and communication thereof. The trigger 126, embodied as an ICR write operation, includes writing specific values to the source ICR 124A to cause the IPI 128 to be generated. The trigger 126, in some implementations, is a write operation performed by one of the source processor cores 112A. In alternative implementations, the trigger 126 is a write operation performed by an external device, such as a peripheral device connected to the system 100A via the I/O die 106.

In the illustrated example, the I/O die 106 is depicted as including a history buffer cache 132. The history buffer cache 132 is used in some implementations to store (generally shown at 134) frequently accessed cache lines 120 pointed by the source history buffer 116A. The history buffer cache 132 helps when the IPI 128 is broadcast towards the destination CCX 110B (or multiple CCXs 110) to be received by the destination processor cores 112B.

Figure 1B:
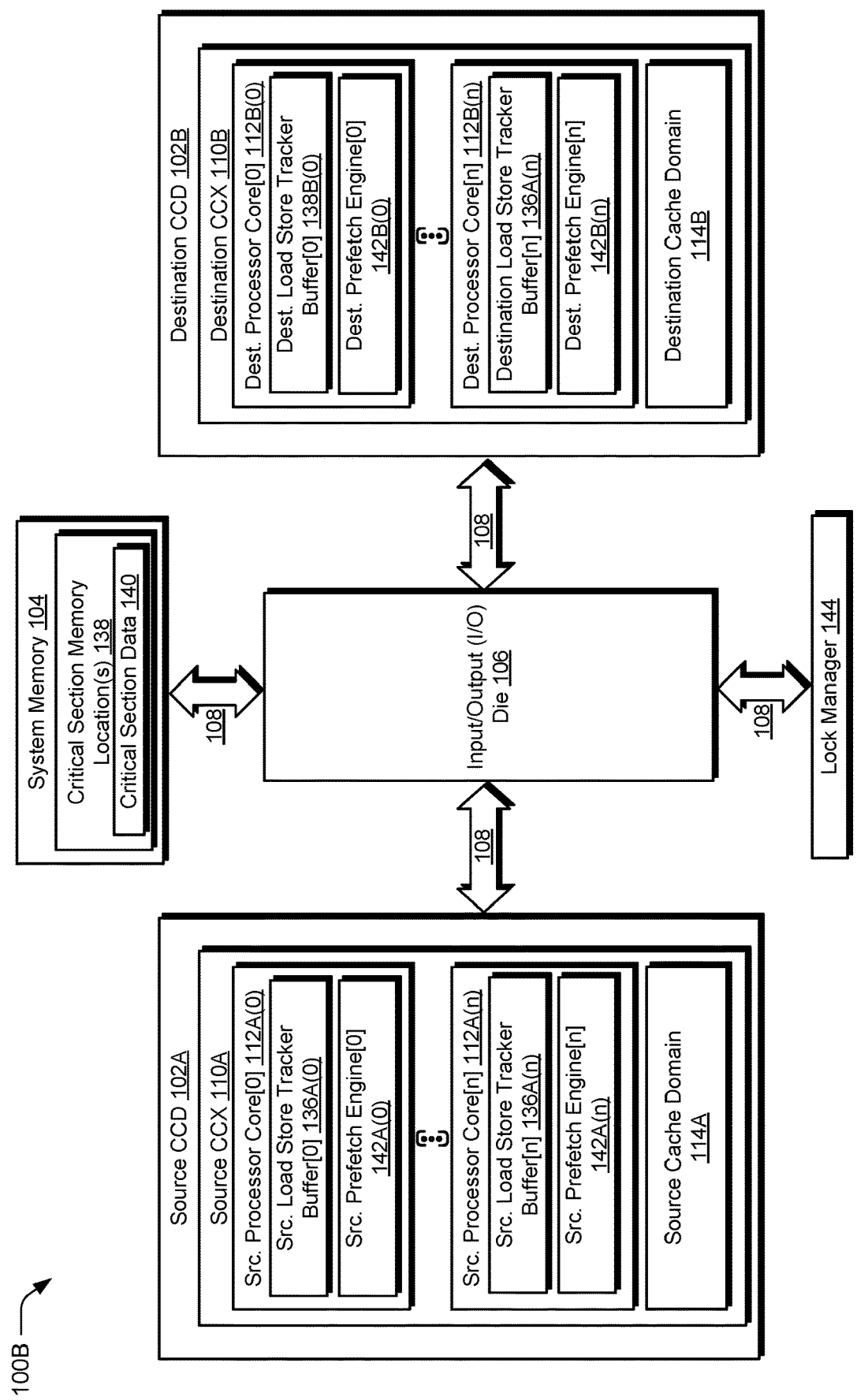
FIG. 1B is a block diagram depicting a non-limiting example system having, in part, a lock manager and multiple core complex dies that each include multiple processor cores, wherein each processor core is configured with a load store tracker buffer and a prefetch engine.

FIG. 1B is a block diagram of another non-limiting example multi-die processing system 100B (hereafter "system 100B"). The basic configuration of the system 100B is unchanged from the system 100A shown in FIG. 1A. Specifically, the system 100B includes the CCDs 102, the system memory 104, the I/O die 106, the connection/interface 108, the CCXs 110, the processor cores 112, and the cache domains 114. These components are described in detail above and will not be described in detail with reference to FIG. 1B.

The source processor cores 112A(0)-112A(n) include source load store tracker buffers 136A(0)-136A(n), respectively. Similarly, the destination processor cores 112B(0)-112B(n) include destination load store tracker buffers 136B(0)-136B(n), respectively. The source load store tracker buffers 136A and the destination load store tracker buffers 136B, at times, are referred to individually as "the load store tracker buffer 136" or collectively as "the load store tracker buffers 136." The load store tracker buffers 136 are configured to track most recent critical section memory locations 138 fetched by the corresponding processor core 112.

In some implementations, the load store tracker buffers 136 are hardware storage components (e.g., one or more memory circuits or portion(s) thereof) configured to manage data (e.g., the most recent critical section memory location 138) by temporarily saving the data in a state that is easier to move, process, and/or manipulate versus other data storage techniques. In the illustrated example, the load store tracker buffers 136 are illustrated as separate memory/cache components, although the load store tracker buffers 136, in some implementations, are regions of memory or cache (e.g., a region of one or more caches in the source/destination cache domains 114A, 114B).

The critical section memory locations 138 identify the locations within the system memory 104 that stores critical section data 140. The critical section data 140 is data associated with one or more critical sections of code of a program. Critical sections are defined within the source code of a program and are typically implemented using synchronization primitives provided by a programming language or an operating system. The synchronization primitives used to implement critical sections, such as locks, mutexes, semaphores, and condition variables, are stored in memory (e.g., the system memory 104), in system data structures managed by the operating system or the runtime environment of the programming operation.

The source processor cores 112A(0)-112A(n) also include source prefetch engines 142A(0)-142A(n), respectively. Similarly, the destination processor cores 112B(0)-112B(n) include source prefetch engines 142B(0)-142B(n), respectively. The source prefetch engines 142A and the destination prefetch engines 142B, at times, are referred to individually as "the prefetch engine 142" or collectively as "the prefetch engines 142." The prefetch engine 142 is enabled if the corresponding processor core 112 has executed a spin lock operation. The prefetch engines 142 are configured to obtain the critical section memory location(s) 138 from the load store tracker buffer 136 of the processor core 112 that previously held a lock on the critical section data 140 (also referred to herein as a previous lock holder processor core).

The source CCX 110A and the destination CCX 110B are also in communication with a lock manager 144. The lock manager 144 is configured to signal the load store tracker buffer(s) 136 to start (or stop) tracking the critical section memory location(s) 138. The lock manager 144 also is configured to provide the base address of the load store tracker buffer 136 of the previous lock holder processor core to the prefetch engine 142 of the processor core 112 that currently holds a lock on the critical section data 140 (also referred to herein as a current lock holder processor core). In one or more implementations, the lock manager 144 is implemented as part of an operating system or program executed by the system 100B.

Figure 2:
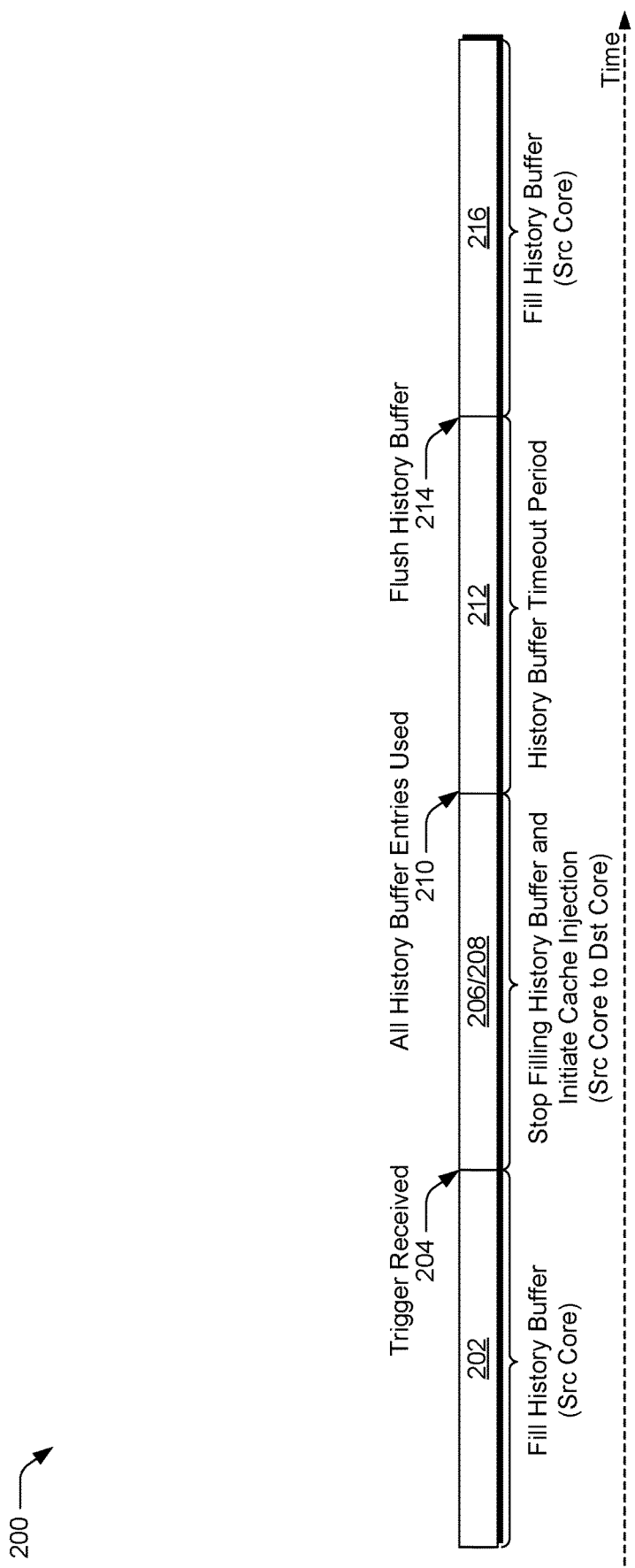
FIG. 2 is a timing diagram depicting a non-limiting example of a cache injection mechanism.

FIG. 2 is a timing diagram 200 depicting a non-limiting example of a cache injection mechanism in which the source processor core 112A pushes one or more cache lines 120 to the destination processor core 112B (e.g., the destination cache domain 114B). The timing diagram 200 will be described with additional reference to FIG. 1A. The timing diagram 200 starts when the source history buffer logic 119A fills the source history buffer 116A with the source cache line addresses 118A associated with recently executed source cache lines 120A. The source history buffer logic 119A continues to fill the source history buffer 116A until a trigger 126 is received (e.g., an MMIO operation, such as an ICR write), a spin unlock operation, or another predefined hardware or software trigger), as shown generally at 204.

After the trigger 126, the source history buffer logic 119A stops filling the source history buffer 116A, as shown generally at 206. The source cache injection logic 121A then initiates a cache injection, as shown generally at 208. More particularly, at 208, the source cache injection logic 121A transfers the source cache lines 120A from the source cache domain 114A to the destination processor core 112B. In some implementations, the source cache lines 120 are transferred to the destination cache domain 114B, such as an L1, L2, and/or L3 cache associated with the destination processor core 112B.

When all history buffer entries (i.e., the source cache line addresses 118A) are used by the destination processor core(s) 112B, as shown generally at 210, the source history buffer logic 119A freezes the source history buffer 116A during a timeout period, as shown generally at 212. The source history buffer logic 119A freezes the source history buffer 116A because one or more of the source processor cores 112A will sometimes send multiple IPIs 128 to multiple destination processor cores 112B. After the timeout period expires, the source cache injection logic 121A flushes the source cache line addresses 118A from the source history buffer 116A, as shown generally at 214. The source history buffer 116A is then available to be filled again, as shown generally at 216, and the process repeats as needed.

The techniques described herein provide maximum efficiency using the cache injection mechanism, such as depicted in the timing diagram 200 described above. A pull cache injection mechanism is also contemplated. In some implementations, the pull cache injection mechanism involves a source processor core 112A that communicates the cache line addresses 118 to one or more destination processor cores 112B, which uses the cache line addresses 118 to fetch the cache lines 120 into the destination cache domain 114B. This mechanism is less efficient compared to the push mechanism.

Figure 3:
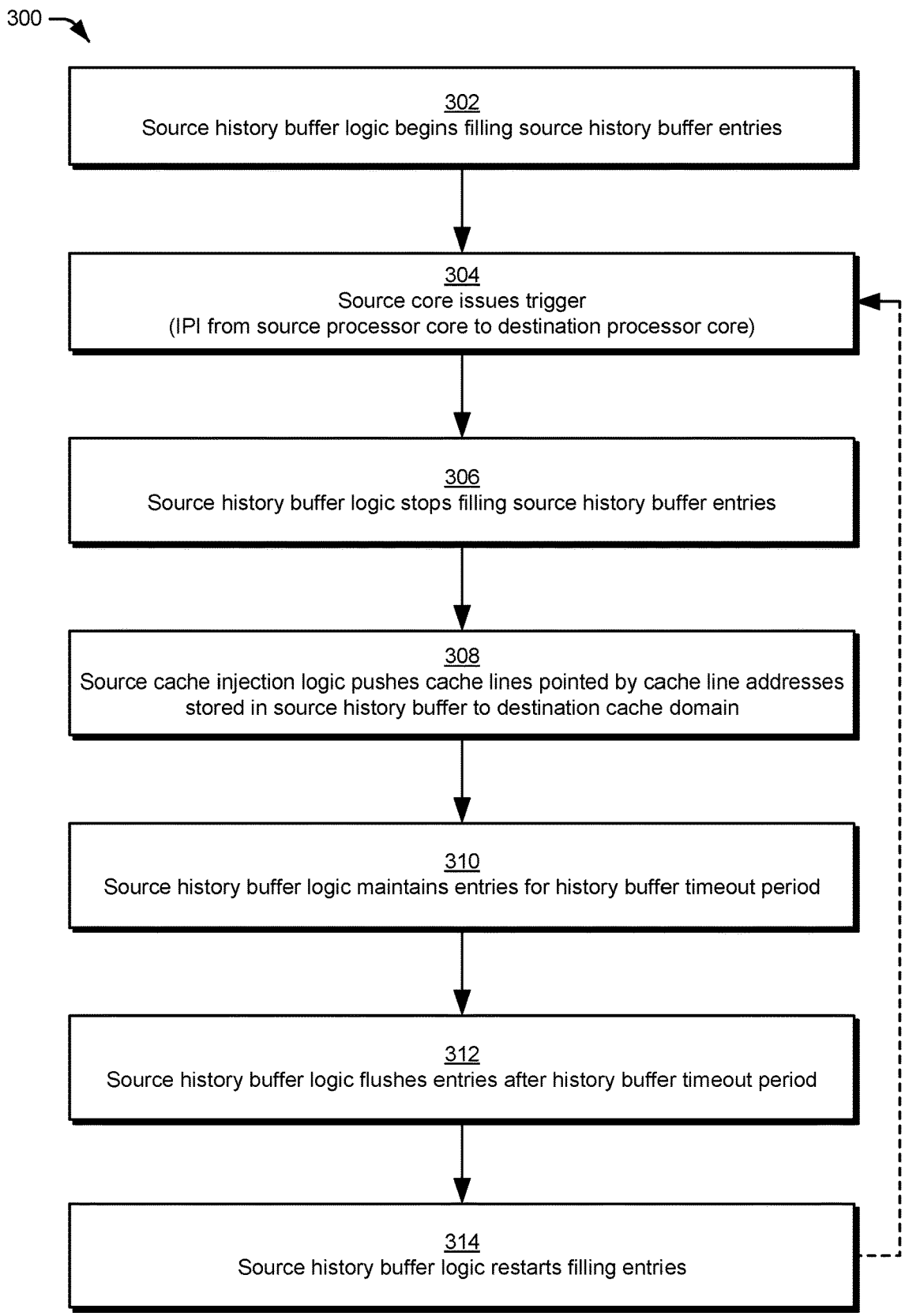
FIG. 3 is a flow diagram depicting a method for implementing a cache injection mechanism.

FIG. 3 depicts a method 300 for implementing a cache injection mechanism. The method 300 begins and proceeds to block 302. At block 302, the source history buffer logic 119A begins filling the source history buffer 116A with the source cache line addresses 118A. From block 302, the method 300 proceeds to block 304.

At block 304, the source processor core 112A issues a trigger 126. For example, the source processor core 112A writes to the source ICR 124A, which triggers the IPI 128 from the source processor core 112A to one or more of the destination processor cores 112B. As another example, a spin unlock operation is the trigger 126. From block 304, the method 300 proceeds to block 306. At block 306, in response to the trigger 126, the source history buffer logic 119A stops filling the source history buffer 116A with the source cache line addresses 118A. From block 306, the method 300 proceeds to block 308.

At block 308, the source cache injection logic 121A initiates a cache injection. More particularly, the source cache injection logic 121A transfers (pushes) the source cache lines 120A pointed by the source cache line addresses 118A stored in the source history buffer 116A to the destination processor core(s) 112B. In some implementations, the source cache lines 120A are transferred to an L1 cache and/or an L2 cache in the destination cache domain 114B. In other implementations, the source cache lines 120A are transferred to an L3 cache in the destination cache domain 114B to be shared among multiple destination processor cores 112B. Moreover, in some implementations, a copy of at least some of the source cache lines 120A are stored in the history buffer cache 132. This copy includes frequently accessed cache lines 120, such as when the IPI 128 is a broadcast IPI. From block 308, the method 300 proceeds to block 310.

At block 310, the source history buffer logic 119A maintains the source cache line addresses 118A in the source history buffer 116A for a history buffer timeout period. In some implementations, the buffer timeout period is a fixed time period. In other implementations, the history buffer timeout period is a dynamic time period that changes based upon one or more conditions, such as related to the content of the source cache lines 120. From block 310, the method 300 proceeds to block 312.

At block 312, the source history buffer logic 119A flushes the source cache line addresses 118A from the source history buffer 116A after the history buffer timeout period. From block 312, the method 300 proceeds to block 314. At block 314, the source history buffer logic 119A restarts filling the source history buffer 116A with the source cache line addresses 118A. In some implementations, the method 300 returns to block 304 and continues as described above.

Figure 4:
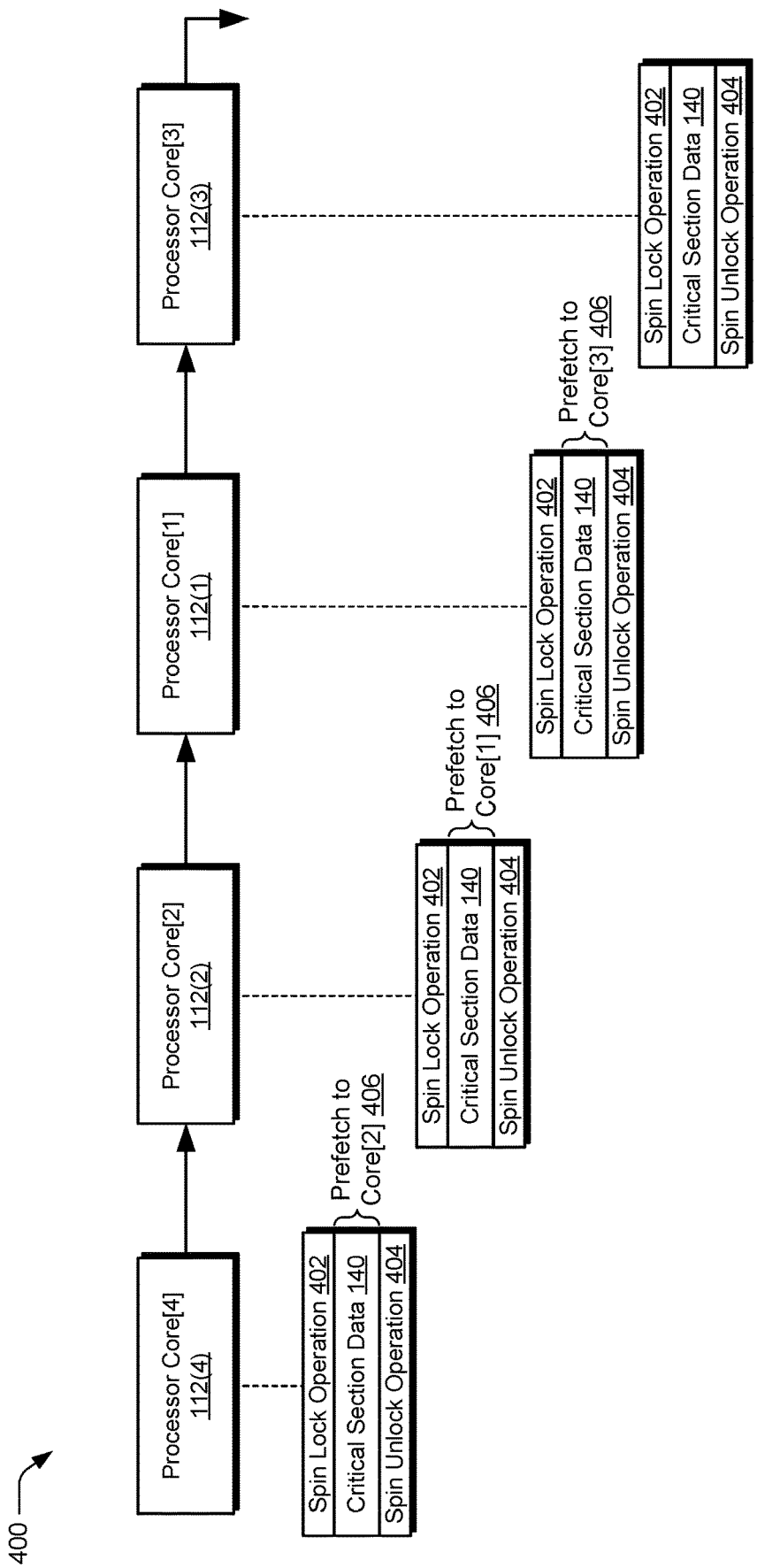
FIG. 4 is a block diagram depicting a non-limiting example of a spinlock-based prefetching mechanism.

FIG. 4 is a block diagram depicting a non-limiting example of a spinlock-based prefetching mechanism 400. FIG. 4 will be described with additional reference to FIG. 1B. Queue-based spinlock is a synchronization primitive in kernel. In many cases, spinlocks are used to protect a shared data structure. If there are multiple threads accessing the critical section data 140, the same data is to be fetched at multiple cores in a sequential manner. If the next lock waiter is known beforehand, the data is prefetched to the next lock waiter processor core. A queue-based spinlock has this information about the lock waiters embedded in its implementation. The spinlock-based prefetching mechanism 400 uses the prefetch engine 142. The prefetch engine 142 uses the next lock waiter information from a queue spinlock for prefetching the critical section data 140 to the next lock waiter processor core. The spinlock-based prefetching mechanism 400 illustrates these concepts.

In the illustrated example, the spinlock-based prefetching mechanism 400 is implemented using four processor cores 112—a processor core[4] 112(4), a processor core[2] 112(2), a processor core[1] 112(1), and a processor core[3] 112(3). Although four processor cores 112 are shown, the spinlock-based prefetching mechanism 400 is capable of being implemented using any number of processor cores 112.

The processor core[4] 112(4) performs a spin lock operation 402 that triggers tracking of the critical section memory location(s) 138 of the critical section data 140. After the processor core[4] 112(4) performs a spin unlock operation 404, the processor core[4] (4) prefetches (shown at 406) the critical section data 140 to the processor core[2] 112(2). After the processor core[2] 112(2) performs a spin unlock operation 404, the processor core[2] (2) prefetches (shown at 406) the critical section data 140 to the processor core[1] 112(1). After the processor core[1] 112(1) performs a spin unlock operation 404, the processor core[1] (1) prefetches (shown at 406) the critical section data 140 to the processor core[3] 112(3). This procedure repeats for any number of processor cores 112.

Figure 5:
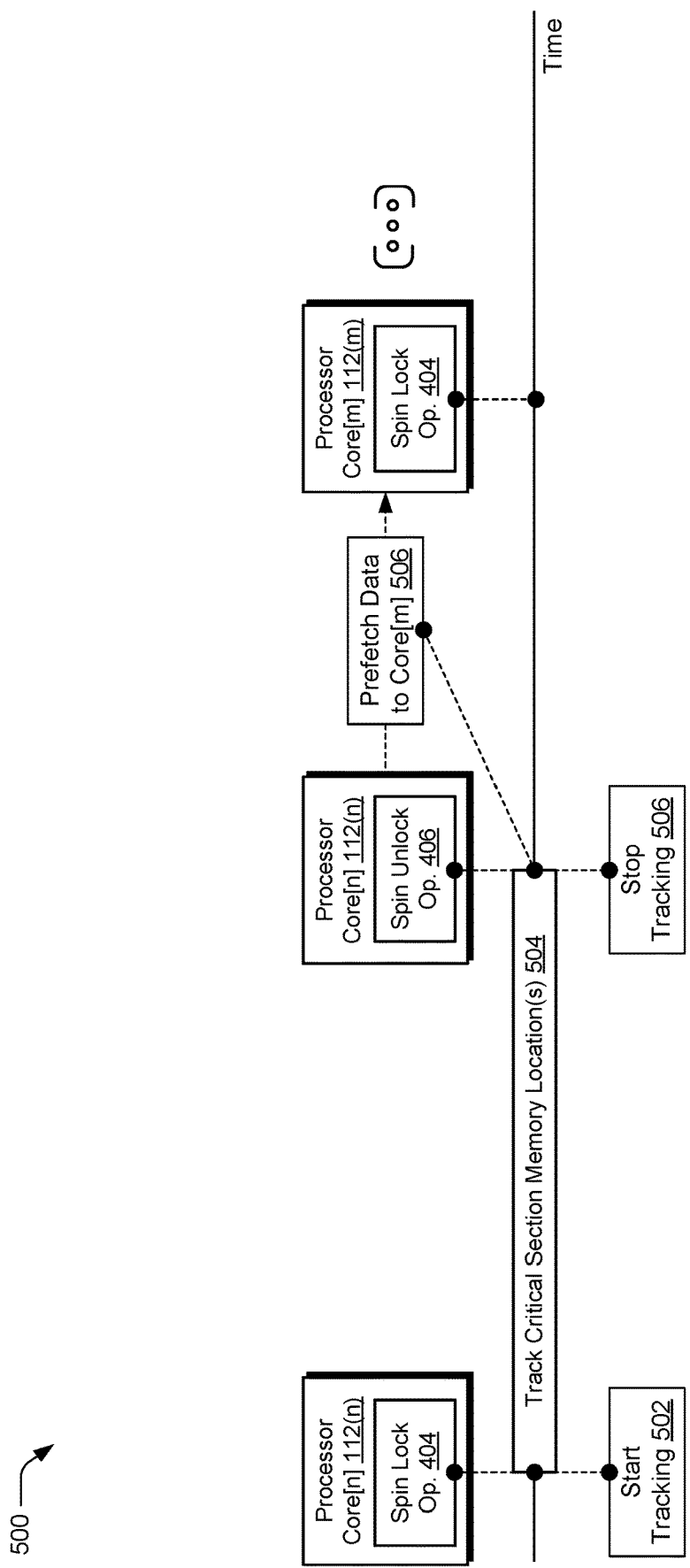
FIG. 5 is a timing diagram depicting a non-limiting example of a spinlock-based prefetching mechanism.

FIG. 5 is a timing diagram 500 depicting a non-limiting example of the spinlock-based prefetching mechanism 400. FIG. 5 will be described with additional reference to FIG. 1B and FIG. 4. The timing diagram 500 includes a processor core[n] 112(n) and a processor core[m] 112[m]. The processor core[n] 112(n) performs a spin lock operation 404, which prompts the lock manager 144 to send a signal to the load store tracker buffer 136 to start tracking (502) the critical section memory location(s) 138. The load store tracker buffer 136 then tracks (504) the critical section memory location(s) 138 until the processor core[n] 112(n) performs a spin unlock operation 406. The spin unlock operation 406 prompts the lock manager 144 to send a signal to the load store tracker buffer to stop tracking (506) the critical section memory location(s) 138. The critical data 140 associated with the critical section memory location(s) 138 is then prefetched to the processor core[m] 112[m]. This procedure repeats for any additional processor cores 112. Additional details of the spinlock-based prefetching mechanism 400 are described below in two distinct phases-after a spin lock operation and after a spin unlock operation.

Figure 6A:
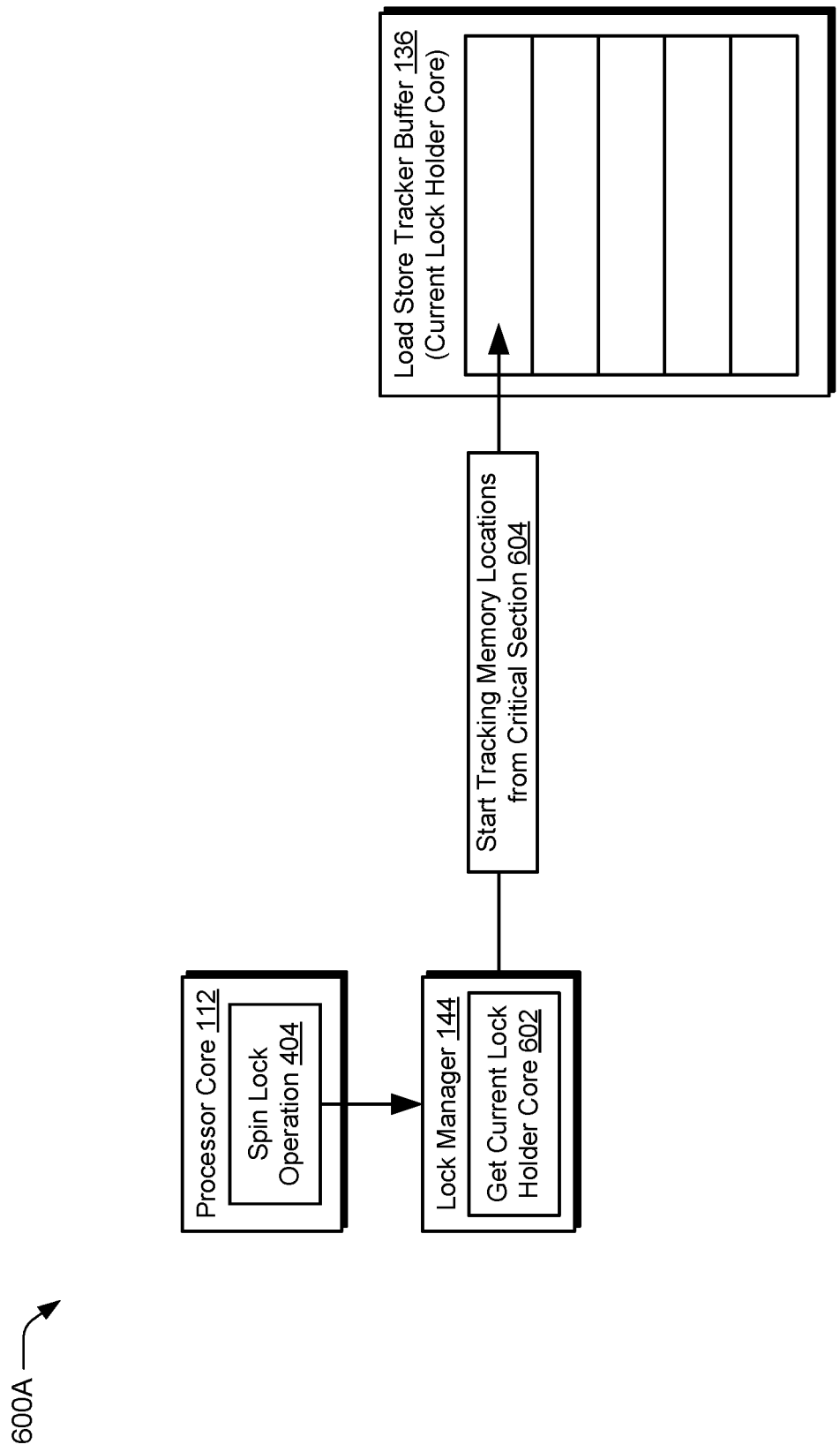
FIG. 6A is a block diagram depicting a non-limiting example of a first phase of a spinlock-based prefetching mechanism after a lock operation.

FIG. 6A is a block diagram depicting a non-limiting example of a first phase 600A of the spinlock-based prefetching mechanism 400 after a spin lock operation 404 is performed by the processor core 112. In particular, the spin lock operation 404 performed by the processor core 112 prompts the lock manager 144 to get (602) the ID of the current lock holder. The lock manager 144 then instructs the load store track buffer 136 of the current lock holder to start tracking (604) the critical section memory location(s) 138.

Figure 6B:
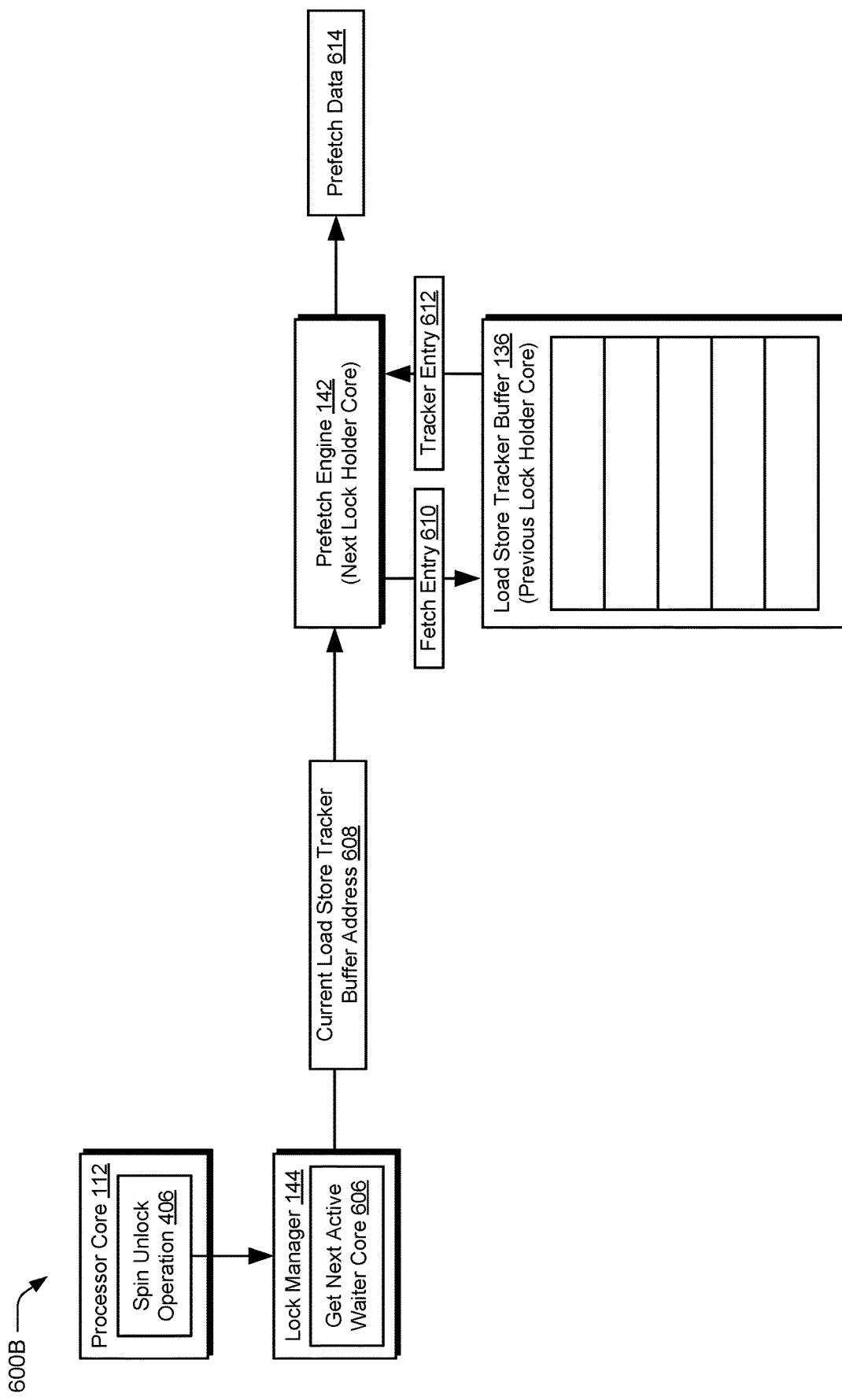
FIG. 6B is a block diagram depicting a non-limiting example of a second phase a spinlock-based prefetching mechanism after an unlock operation.

FIG. 6B is a block diagram depicting a non-limiting example of a second phase 600B of the spinlock-based prefetching mechanism 400 after a spin unlock operation 406 is performed by the processor core 112. In particular, the spin unlock operation 406 prompts the lock manager 144 to get (606) the next active waiter core (e.g., the processor core[m] 112(m) in FIG. 5). The lock manager 144 then provides (608) the current load store tracker buffer 136 address to the prefetch engine 142 of the next lock holder core. The prefetch engine 142 sends a fetch entry request 610 to the load store tracker buffer 136 of the previous lock holder core (e.g., the processor core[n] 112(n) in FIG. 5) to fetch the critical section memory location(s) 138. The load store tracker buffer 136 responds with the requested tracker entry 612. The prefetch engine 142 then prefetches the critical section data associated with the critical section memory location(s) 138 and provides the prefetched data (614) to the next lock holder core for processing.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein, including, where appropriate, the source CCD 102A, the destination CCD 102B, the system memory 104, the I/O die 106, the connection/interface 108, the source CCX 110A, the destination CCX 110B, the source processor core(s) 112A, the destination processor core(s) 112B, the source cache domain 114A, the destination cache domain 114B, the source history buffer 116A, the destination history buffer 116B, the source history buffer logic 119A, the destination history buffer logic 119B, the source cache injection logic 121A, the destination cache injection logic 121B, the source interrupt controller 122A, the destination interrupt controller 122B, the source ICR 124A, the destination ICR 124B, the history buffer cache 132, the source load store tracker buffers 136A, the destination load store tracker buffers 136B, the source prefetch engines 142A, the destination prefetch engines 142B, and the lock manager 144 are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a history buffer configured to store, for a fixed time, cache line addresses; and
   a processor core connected to the history buffer, the processor core configured to flush, after the fixed time, the cache line addresses from the history buffer and add new cache line addresses into the history buffer.

2. The system of claim 1, wherein the processor core is further configured to transfer cache lines corresponding to the cache line addresses stored in the history buffer to a cache domain corresponding to a second processor core.

3. The system of claim 2, wherein the processor core is part of a first core complex, and the second processor core is part of a second core complex.

4. The system of claim 3, wherein the first core complex is part of a first core complex die, the second core complex is part of a second core complex die, and the first core complex die and the second core complex die are on a same non-uniform memory access node.

5. The system of claim 3, wherein the first core complex is part of a first core complex die, the second core complex is part of a second core complex die, and the first core complex die and the second core complex die are on a different non-uniform memory access node.

6. The system of claim 3, wherein the first core complex is part of a first core complex die, the second core complex is part of a second core complex die, and the first core complex die and the second core complex die are on a same socket.

7. The system of claim 3, wherein the first core complex is part of a first core complex die, the second core complex is part of a second core complex die, and the first core complex die and the second core complex die are on a different socket.

8. The system of claim 2, wherein the processor core and the second processor core are both connected to an input/output die that includes:
   a history buffer cache configured to store one or more frequently accessed cache lines of the cache lines; or
   a history buffer cache configured to store one or more frequently accessed cache line addresses of one or more frequently accessed cache lines.

9. The system of claim 2, wherein the cache domain includes a multilevel cache hierarchy.

10. The system of claim 1, wherein the processor core is configured to flush, after the fixed time, the cache line addresses from the history buffer and add the new cache line addresses into the history buffer responsive to a trigger, the trigger including a memory-mapped input/output write command directed to an interrupt command register or a spin unlock operation.

11. A method comprising:
    filling buffer entries of a history buffer with cache line addresses;
    stopping filling the buffer entries of the history buffer in response to a trigger;
    transferring the cache line addresses in the buffer entries to a destination;
    maintaining the buffer entries for a timeout period; and
    flushing the buffer entries after the timeout period.

12. The method of claim 11, wherein filling the buffer entries of the history buffer with the cache line addresses includes filling the buffer entries of the history buffer with the cache line addresses in response to operations performed by a first processor core.

13. The method of claim 12, wherein the destination includes a second processor core, and wherein transferring the cache line addresses in the buffer entries to the destination includes transferring the cache line addresses in the buffer entries to a cache domain associated with the second processor core.

14. The method of claim 13, wherein the cache domain includes a multilevel cache hierarchy.

15. The method of claim 12, wherein the destination includes a multilevel cache hierarchy, and wherein transferring the cache line addresses in the buffer entries to the destination includes transferring the cache line addresses in the buffer entries to the multilevel cache hierarchy associated with multiple destination processor cores of a destination core complex residing on a destination core complex die.

16. A method comprising:
   flushing, by a processor core, cache line addresses from a history buffer after being stored in the history buffer for a fixed time; and
   adding, by the processor core, new cache line addresses into the history buffer.

17. The method of claim 16, further comprising transferring cache lines corresponding to the cache line addresses stored in the history buffer to a cache domain corresponding to a second processor core.

18. The method of claim 17, wherein the processor core is part of a first core complex die, and the second processor core is part of a second core complex die.

19. The method of claim 18, wherein the first core complex die and the second core complex die are on a same non-uniform memory access node.

20. The method of claim 18, wherein the first core complex die and the second core complex die or on different non-uniform memory access nodes.

\* \* \* \* \*